D. L. ADAMS.
SAWMILL.
APPLICATION FILED SEPT. 19, 1913.
1,105,591. Patented July 28, 1914.
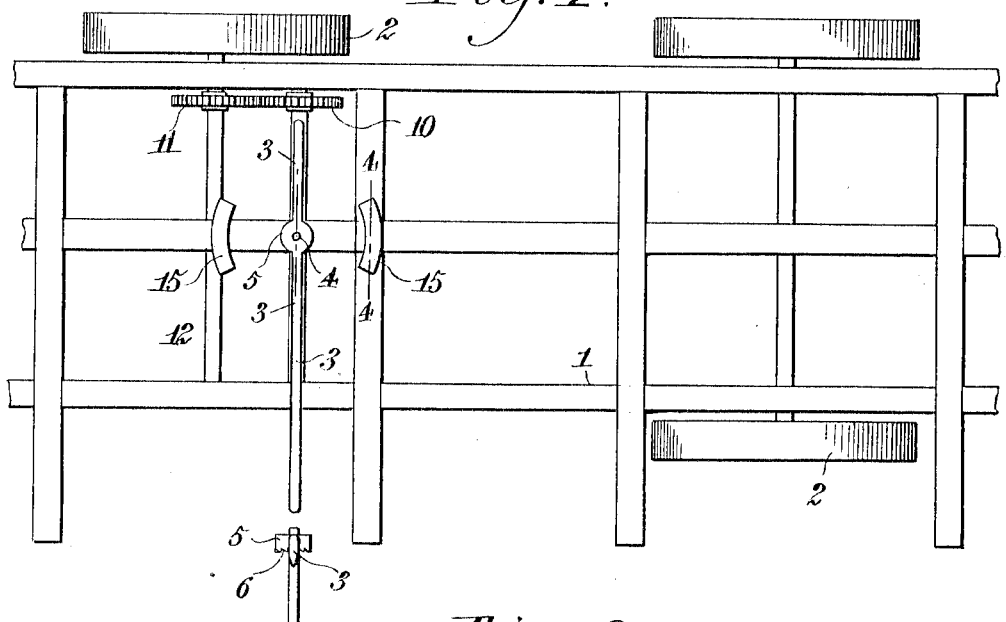
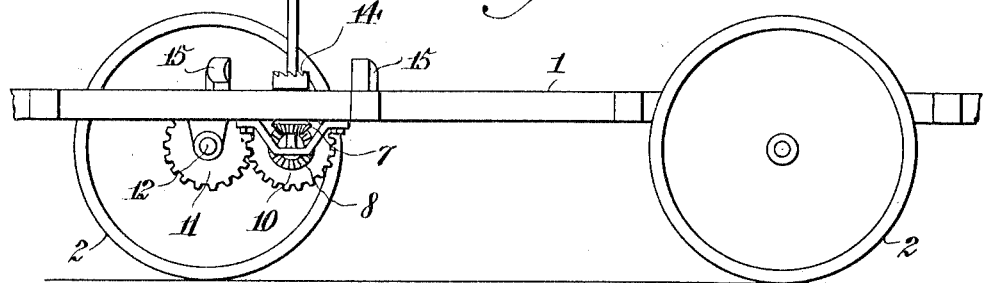
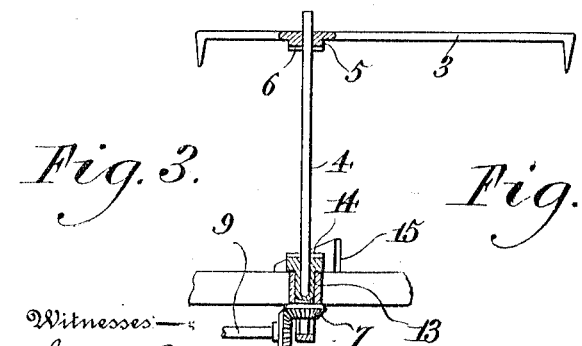
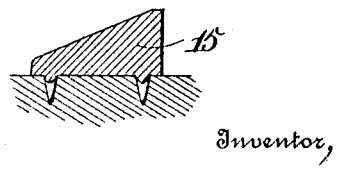
Inventor,
D. L. Adams.
By Victor J. Evans,
Attorney.

UNITED STATES PATENT OFFICE.

DAVID L. ADAMS, OF AYLETT, VIRGINIA.

SAWMILL.

1,105,591.   Specification of Letters Patent.   Patented July 28, 1914.

Application filed September 19, 1913. Serial No. 790,727.

*To all whom it may concern:*

Be it known that I, DAVID L. ADAMS, a citizen of the United States, residing at Aylett, in the county of King William and State of Virginia, have invented new and useful Improvements in Sawmills, of which the following is a specification.

This invention relates to saw mills and particularly to the saw mill dog mechanism, the object of the invention being to provide a novel mounting for the master dog, whereby, when a log is removed from the carriage and the dog is left unsupported, it will be automatically turned out of the way of the saw so as not to injure the saw by coming in contact therewith during the further movement of the carriage. Ordinarily it is necessary to shift the dog referred to by hand after the removal of the work from the carriage and as a result the position of the dog is often inadvertently overlooked, resulting in serious damage to the saw and other parts of the machine as well as endangering the life of those standing near the carriage and saw.

The broad object of the invention is to render this condition impossible by providing means for moving the dog out of the path of the saw.

With the above and other objects in view, the invention consists in the construction, combination and arrangement of parts, as will hereinafter be more fully described, illustrated and claimed.

In the accompanying drawings:—Figure 1 is a plan view of a sufficient portion of a saw mill carriage to illustrate the application of the present invention thereto. Fig. 2 is a side elevation of the same. Fig. 3 is a vertical section on the line 3—3 of Fig. 1. Fig. 4 is a vertical section on the line 4—4 of Fig. 1.

Referring to the drawings, 1 designates a saw mill carriage of ordinary construction the same being mounted upon the carrying wheels 2 bearing the usual relation to the frame of the saw carriage.

3 designates the master dog which in carrying out the present invention is mounted to slide up and down on a vertical shaft 4, the dog 3 being provided with a hub or body 5 having a central opening for the shaft 4 and provided on the under side thereof with ratchet teeth 6 the purpose of which will hereinafter appear. The shaft 4 is journaled in suitable bearings on the carriage and is provided below the floor or log supporting surface of the carriage with a bevel gear wheel 7 which meshes with and is driven by a bevel gear wheel 8 fast on a horizontal shaft 9 which extends laterally to one side of the carriage where it has fast thereon a spur gear wheel 10 meshing with and driven by a similar gear wheel 11 on one of the carrying wheels 2 or the axle 12 of one pair of wheels. By means of the gearing just referred to, the shaft 4 is continuously revolved while the carriage is in operation. The wheel 7 is provided on its upper side with a hub or sleeve 13 provided with ratchet teeth 14 which are adapted to engage the ratchet teeth 6 on the bottom of the dog when the dog slides downwardly on the shaft 4. In this way a partial rotation is imparted to the dog 3. As the dog is revolved on the shaft 4 by means of the ratchet teeth 6 and 14, the oppositely projecting portions of the dog ride upwardly upon the wedge-shaped projections or cams 15 which are of sufficient rise or height to elevate the dog 3 to a position where the teeth 6 will be moved out of engagement with the teeth 14. When this occurs, the dog comes to rest upon the projections 15 at a time when said dog extends substantially in the direction of length of the carriage. At such time the dog occupies a position out of the path of the saw so that it is impossible for said dog to come into contact with the teeth of the saw. As the wheel 7 is continually revolving, the action referred to of the dog takes place whenever the dog descends by gravity after being released from the work.

What I claim is:—

1. The combination with a saw mill carriage, of a dog, a rotary shaft geared to and driven by one of the wheels of said carriage and having said dog mounted to turn loosely thereon, and ratchet elements on said shaft and dog brought into coöperative relation when the dog is unsupported by a log, whereby the dog is moved out of the path of the saw.

2. The combination with a saw mill carriage, of a dog, a rotary shaft geared to and driven by one of the wheels of said carriage and having said dog mounted to turn loosely thereon, ratchet elements on said shaft and dog brought into coöperative relation when the dog is unsupported by a log, whereby the dog is moved out of the path of the saw, and means operating automatically to disengage said ratchet elements after such movement of the dog.

3. The combination with a saw mill carriage, of a dog, a rotary shaft geared to and driven by one of the wheels of said carriage and having said dog mounted to turn loosely thereon, ratchet elements on said shaft and dog brought into coöperative relation when the dog is unsupported by a log, whereby the dog is moved out of the path of the saw, and means in the form of a cam for elevating said dog and disengaging said ratchet elements after the dog has been so moved.

In testimony whereof I affix my signature in presence of two witnesses.

DAVID L. ADAMS.

Witnesses:
B. C. GARRETT,
M. W. PULLER.

Copies of this patent may be obtained for five cents each, by addressing the "Commissioner of Patents, Washington, D. C."